United States Patent
Busch et al.

(10) Patent No.: US 9,582,314 B2
(45) Date of Patent: Feb. 28, 2017

(54) MANAGING DATA CONSISTENCY BETWEEN LOOSELY COUPLED COMPONENTS IN A DISTRIBUTED COMPUTING SYSTEM

(75) Inventors: Michael Busch, San Jose, CA (US); Rajesh M. Desai, San Jose, CA (US); Tom William Jacopi, San Jose, CA (US); Michael McCandless, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 2183 days.

(21) Appl. No.: 12/567,464

(22) Filed: Sep. 25, 2009

(65) Prior Publication Data
US 2011/0078123 A1    Mar. 31, 2011

(51) Int. Cl.
*G06F 7/00* (2006.01)
*G06F 9/46* (2006.01)

(52) U.S. Cl.
CPC .................. *G06F 9/466* (2013.01)

(58) Field of Classification Search
CPC .......................................... G06F 9/466
USPC ......................................... 707/690
See application file for complete search history.

(56) References Cited

U.S. PATENT DOCUMENTS

| | | | |
|---|---|---|---|
| 6,728,922 B1 * | 4/2004 | Sundaram et al. | 714/769 |
| 7,206,805 B1 * | 4/2007 | McLaughlin, Jr. | 709/203 |
| 7,290,056 B1 * | 10/2007 | McLaughlin, Jr. | 709/230 |
| 7,739,244 B2 * | 6/2010 | Verma et al. | 707/684 |
| 2006/0085426 A1 * | 4/2006 | Verma et al. | 707/10 |
| 2010/0114817 A1 * | 5/2010 | Broeder et al. | 707/612 |

OTHER PUBLICATIONS

Transactors: a programming model for maintaining globally consistent distributed state in unreliable environments, Symposium on Principles of Programming Languages Long Beach, California Jan. 12-14, 2005.*

(Continued)

*Primary Examiner* — Hung T Vy
(74) *Attorney, Agent, or Firm* — Steven M. Greenberg, Esq.; CRGO Law

(57) ABSTRACT

Embodiments of the present invention provide a method, system and computer program product for maintaining distributed state consistency in a distributed computing application. In an embodiment of the invention, a method for maintaining distributed state consistency in a distributed computing application can include registering a set of components of a distributed computing application, starting a transaction resulting in changes of state in different ones of the components in the registered set and determining in response to a conclusion of the transaction whether or not an inconsistency of state has arisen amongst the different components in the registered set in consequence of the changes of state in the different ones of the components in the registered set. If an inconsistency has arisen, each of the components in the registered set can be directed to rollback to a previously stored state. Otherwise a committal of state can be directed in each of the components in the registered set.

14 Claims, 2 Drawing Sheets

(56) References Cited

OTHER PUBLICATIONS

Field et al. (Transactors: a programming model for maintaining globally consistent distributed state in unreliable environments, Symposium on Principles of Programming Languages Long Beach, California Jan. 12-14, 2005).*

Field, John; Varela, carlos A.; "Transactors: A Programming Model for Maintaining Globally Consistent Distributed State in Unreliable Environments"; Extended Version of POPL'05 proceedings paper; Jan. 12-14, 2005.

* cited by examiner

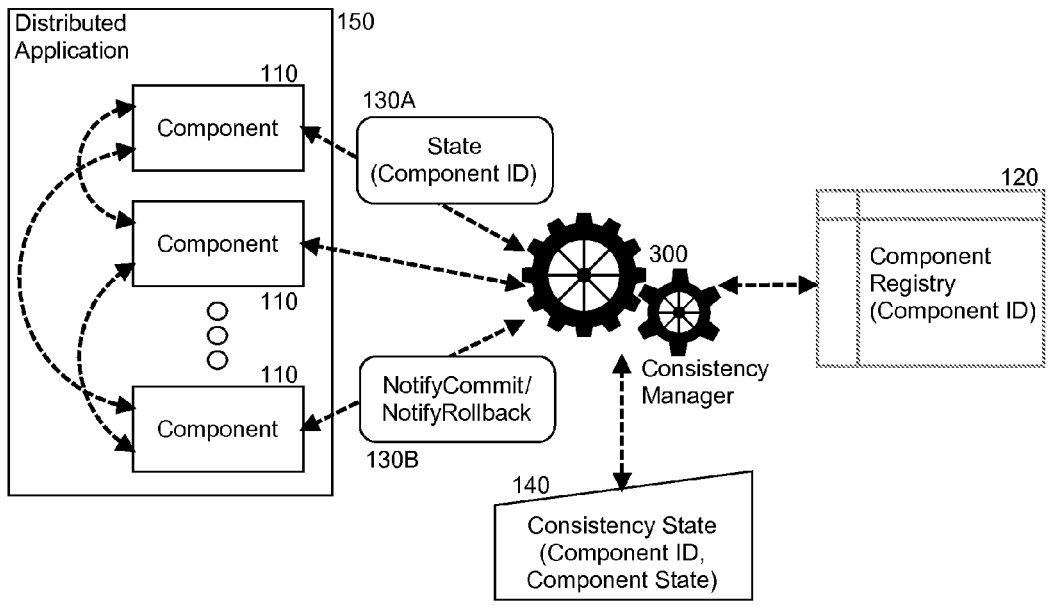
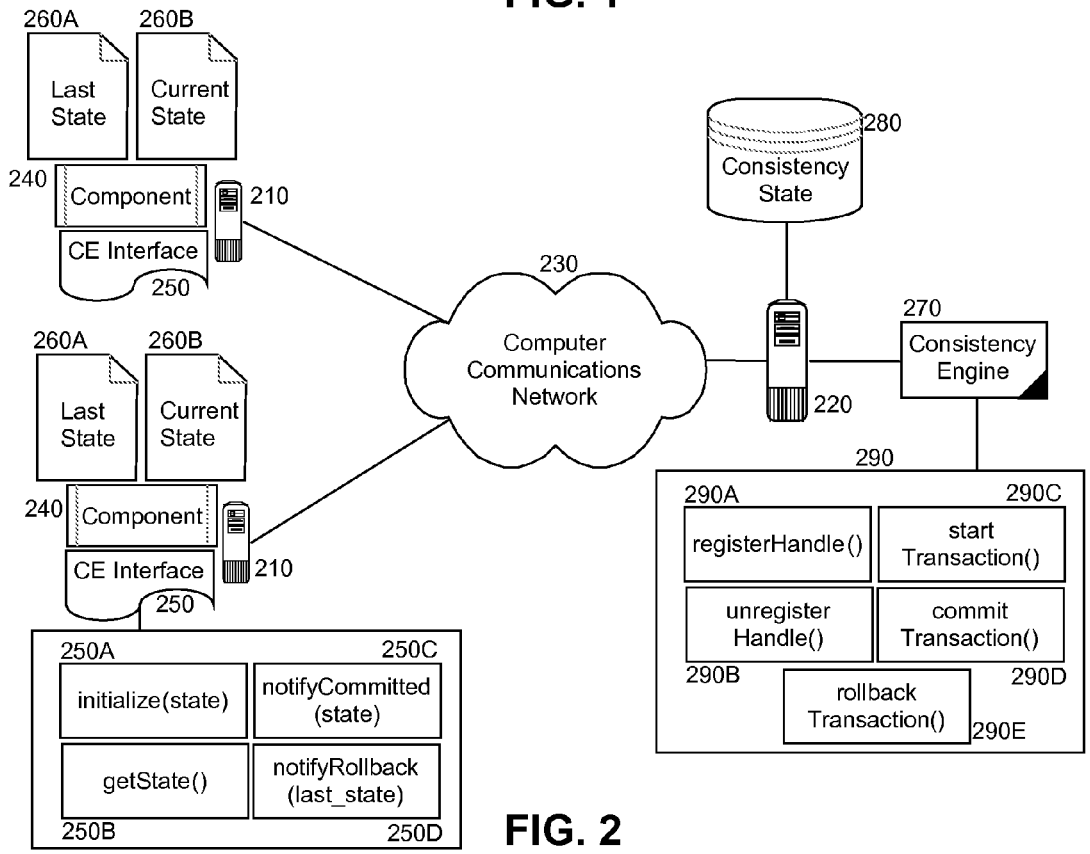

MANAGING DATA CONSISTENCY BETWEEN LOOSELY COUPLED COMPONENTS IN A DISTRIBUTED COMPUTING SYSTEM

BACKGROUND OF THE INVENTION

Field of the Invention

The present invention relates to the field of distributed computing and more particularly to maintaining distributed state consistency in a distributed computing application.

Description of the Related Art

Distributed computing refers to the use of multiple different computing hosts, each with processor and memory, coupled to one another over a computer communications network, arranged to achieve a common goal. Distributed computing programs are the program logic hosted by the different computing hosts and configured to provide the program code that when executed cooperatively with one another, produces a common result. Classic examples of distributed computing programs include banking systems managing banking transactions between banking institutions, real estate transactional systems managing the purchase and sales of real estate between buyer and seller as facilitated by respective brokers, and the like. Component based applications represent one type of distributed computing program utilizing resilient, communicative object oriented technologies in order to effectively implement a distributed computing application.

Conventionally, ensuring the accurate of completion of a transaction in a distributed computing application necessitated computing protocols such as the venerable two-phase commit. In transaction processing, as well as in database management, and computer networking, the two-phase commit protocol, also known as "2PC", is a type of atomic commitment protocol. Specifically, 2PC is a distributed algorithm that coordinates the determination by the processes participating in a distributed atomic transaction as to committing or aborting (rolling back) the transaction. The 2PC protocol focuses on recovery from failure and achieves its goal through the use of a centrally maintained transactions log.

The two phases of 2PC include the commit-request phase and the commit phase. In the former phase, a coordinator process attempts to prepare participating processes in a transaction to take the necessary steps for either committing or aborting the transaction. In the latter phase, the coordinator solicits votes from the processes as to whether or not to commit or abort a subject transaction. The decision by the coordinator to commit or to abort the transaction then is communicated by the coordinator to the participating processes, who in turn can commit or abort individually as the case may be.

In the course of processing a transaction, a distributed computing application must maintain a distributed state reflected by the individual states of different distributed components forming the distributed computing application. In this regard, maintaining an accurate picture of the state of each distributed component in a distributed computing application can be integral to the successful completion of a transaction performed amongst the distributed components. The failure to maintain knowledge of the state of each component can result in a failed transaction utilizing outdated state information thus requiring the rollback of the entire transaction.

Though 2PC has proven effective in the context of error recovery, so much cannot be said of state consistency management. In this regard, while 2PC has proven to be an important approach to error recovery in a distributed system, the success of 2PC is not without consequence. Specifically, the maintenance of a central error recovery log in 2PC, though effective during error recovery, adds substantial processing overhead outside of error recovery. Accordingly, while 2PC provides an algorithm that otherwise would be useful in ensuring consistency of state amongst different distributed processes, the overhead requisite to maintaining a centralized error recovery log, but not requisite to ensuring state consistency is not acceptable.

BRIEF SUMMARY OF THE INVENTION

Embodiments of the present invention address deficiencies of the art in respect to state management in a distributed computing application and provide a novel and non-obvious method, system and computer program product for maintaining distributed state consistency in a distributed computing application. In an embodiment of the invention, a method for maintaining distributed state consistency in a distributed computing application can include registering a set of components of a distributed computing application, starting a transaction resulting in changes of state in different ones of the components in the registered set and determining in response to a conclusion of the transaction whether or not an inconsistency of state has arisen amongst the different components in the registered set in consequence of the changes of state in the different ones of the components in the registered set. If an inconsistency has arisen, each of the components in the registered set can be directed to rollback to a previously stored state. Otherwise a committal of state can be directed in each of the components in the registered set.

In another embodiment of the invention, a distributed computing data processing system can be configured for maintaining distributed state consistency in a distributed computing application. The system can include a host computer with processor and memory and configured for communicative coupling over a computer communications network to different remote hosts. Each of the remote hosts can include at least one processor and memory. Further, each of the remote hosts can support a component of a distributed computing application.

A consistency engine can execute in the memory by the processor of the host computer. The consistency engine can include program code that when executed by the processor directs registered components of the distributed computing application to rollback to a last state stored by each of the components and registered with the consistency engine in response to at least one of the components failing to update to a new state during a transaction. The system also can include a data store of consistency states coupled to the host computer. The data store of consistency states can include different files, each representing a single consistency state for the components. Each file further can include a checksum of a represented consistency state.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for maintaining distributed state consistency in a distributed computing application;

FIG. 2 is a schematic illustration of a distributed computing data processing system configured for maintaining distributed state consistency in a distributed computing application; and, FIG. 3 is a flow chart illustrating a process for maintaining distributed state consistency in the distributed computing data processing system of FIG. 2.

DETAILED DESCRIPTION OF THE INVENTION

Figure 3:
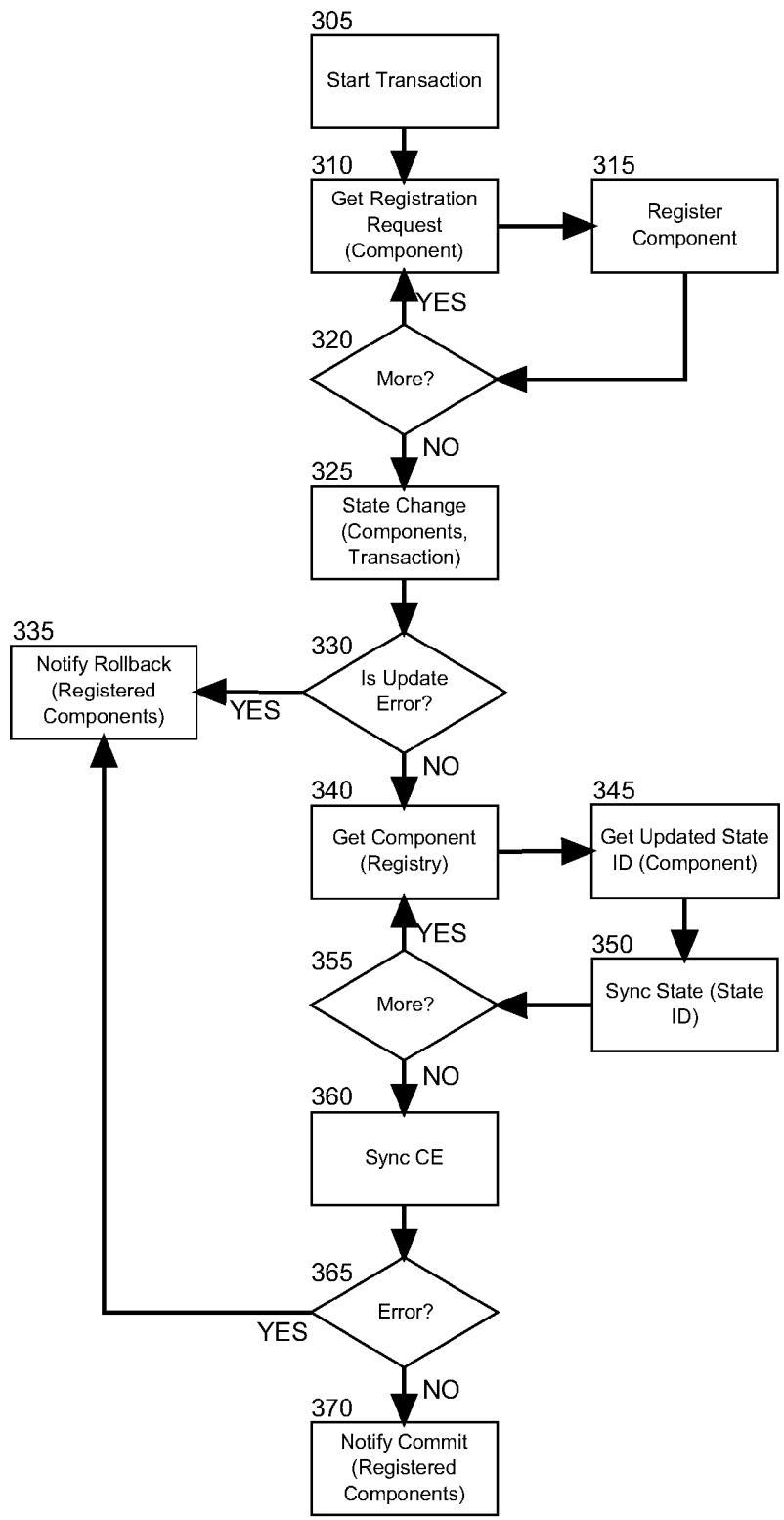

Embodiments of the invention provide for maintaining state consistency in a distributed computing application. In accordance with an embodiment of the invention, a consistency engine can coordinate the committal or rollback of the state of each of a set of different components in a distributed application. In particular, each component in the set of different components can maintain a contemporary state for the component and a previous state of the component. During the course of the transaction, the contemporary state can change in each component and when the transaction has completed, the consistency engine can instruct each component in the set either to commit the contemporary state as the final state, or to rollback to the previous state. In the former instance, the state for each component can be synchronized and stored with the consistency engine and the state of the consistency engine itself can be stored. In this way, consistency in state amongst the components can be maintained without requiring the resource consumptiveness of a centrally maintained error-recovery log.

In further illustration, FIG. 1 pictorially shows a process for maintaining distributed state consistency in a distributed computing application. As shown in FIG. 1, different components 110 of a distributed application 150 can communicate with one another cooperatively to achieve a function or functions of the distributed application 150. To ensure state consistency amongst the components 110, each of the components 110 can register in a component registry 120 of a consistency manager (or consistency engine) 300 in order to maintain state consistency amongst the components 110 of the distributed application 150.

Once registered, each component can receive notification of a start of a transaction during which state changes can occur in each of the components 110. At the conclusion of the transaction, in the absence of an error condition in updating the state for any of the components 110, the consistency engine 300 can synchronize the state 130A of each of the components 110 with a consistency state 140 managed by the consistency engine 300. Otherwise, a rollback notification 130B can be provided to each of the components 110 causing each of the components 110 to revert to a previous state stored individually by each of the components 110 in connection with each of the components 110.

In the former instance, and more particularly, a consistency state 140 for the distributed application can be maintained, such that each contemporary state 130A for each component 110 is accounted for in the consistency state 140 along with a state of the consistency manager 300 itself. Optionally, a checksum for the consistency state 140 can be computed and stored in connection with the consistency state 140 to guarantee the integrity of the consistency state 140. As a result, the consistency of state of the distributed application 150 amongst its components 110 can be assured without requiring the use of a central error-recovery log.

The process described in connection with FIG. 1 can be implemented in a distributed computing data processing system configured to host the execution of a distributed application. In further illustration, FIG. 2 is a schematic illustration of a distributed computing data processing system configured for maintaining distributed state consistency in a distributed computing application. The system can include a host computer 220 with processor and memory communicatively coupled to different remote hosts 210 over computer communications network 230. Each of the remote hosts 210 can include at least one processor and memory and can host the execution of a component 240 of a distributed application.

Each component 240 can implement a consistency engine interface 250 that can include the following methods:
  initialize (current_state) 250A—initialize the component with a specified state
  getState( ) 250B—return the contemporary state of the component
  notifyCommitted(committed_state) 250C—set the contemporary state
  notifyRollback(last_known_valid_state) 250D—rollback to the specified state
Each component 240 further must store both the contemporary state 260B and the previous state 260A.

The host computer 220, in turn, can support the execution of a consistency engine 270. The consistency engine 270 can include program code enabled upon execution by the host computer 220 to support the consistency protocol 290:
  registerHandle(handle) 290A—registers the handle for a given transaction
  unregisterHandle( ) 290B—removes the current handle
  startTransaction( ) 290C—starts a transaction
  commitTransaction( ) 290D—commit a transaction by synchronizing the state of each registered component and synchronizing the state of the consistency engine itself
  rollbackTransaction( ) 290E—invoke the rollback method in each registered component
As such, the consistency engine 270 can maintain a mapping of valid contemporary states 260B for each of the components 240 as the consistency engine 270 can direct the rollback of individual states of each of the components 240 when it is determined that a given one of the components 240 has failed to update its contemporary state 260B during the course of a transaction.

In operation, at startup the consistency engine 270 can assign a valid state to each of the components 240 by reference to a last known consistency state stored in a file in the data store of consistency states 280. The data store of consistency states 280 can include multiple different files, each representing a single consistency state. A checksum can be applied to each consistency state and also stored in the file to ensure the integrity of the consistency state. Consequently, at startup, a selected file with a most recent consistency state first can be validated with an included checksum to ensure the validity of the consistency state. Upon failure to validate, a next file representative of a last known consistency state can be selected. Otherwise, the consistency state can be used to initialize each of the components 240.

Thereafter, for each transaction, the components 240 can be registered with the consistency engine 270 and updates to the individual contemporary states 260B of the components 240 can commence. When the transaction has completed, the consistency engine 270 can direct the committal of the contemporary state 260B in each of the components 240, or the consistency engine 270 can direct a rollback to the last state 260A in each component 240 if a failure to update state is detected in one or more of the components 240. In the former instance, the contemporary state 260B of each of the components can be synchronized with a consistency state in a file to be stored in the data store of consistency states 280 along with a state of the consistency engine 270 itself, and a checksum for the consistency state in the file. In this way, the consistency of state in each of the components 240 can be assured without requiring the maintenance of a centralized log for transaction rollback.

In yet further illustration of the operation of the consistency engine 270 in maintaining state consistency amongst the components 240 of the distributed application, FIG. 3 is a flow chart illustrating a process for maintaining distributed state consistency in the distributed computing data processing system of FIG. 2. Beginning in block 305, a transaction can start during which the state of different components in the distributed application can be updated. In block 310, a first registration request can be received from a component of the distributed application in response to which in block 315 the component can be registered with the consistency engine. In decision block 320, the process can repeat for additional components of the distributed application for all components subject to state consistency maintenance provided by the consistency engine.

In block 325, state changes can occur during the course of the transaction subsequent to which it can be determined in the consistency engine in decision block 330 whether or not to rollback the transaction due to an inconsistent state detected amongst the registered components. In this regard, an inconsistent state can arise during the updating of the state of the components party to the transaction when a component fails to update state successfully. Consequently, in block 335, the consistency engine can direct each registered one of the components to rollback to the previously stored state by invoking the notifyRollback( ) method implemented by each registered component. Otherwise, the process can continue through block 340.

In block 340, a first registered component can be selected for synchronization and in block 345 an updated state identifier for the current state of the selected component can be retrieved. In block 350, a current state of the selected component can be synchronized with the state identifier in the consistency engine and stored in the consistency state in conjunction with an identifier for the selected component. Thereafter in decision block 355, if additional components registered with the consistency engine remain to be processed, the process can repeat in block 340. Otherwise, the state of the consistency engine itself can be synchronized into the consistency state in block 360.

In block 365, if the synchronization process of block 360 results in an error condition, in block 335, the consistency engine can direct each registered one of the components to rollback to the previously stored state by invoking the notifyRollback( ) method implemented by each registered component. Otherwise, the consistency engine can direct each registered one of the components to commit the consistency state by invoking the notifyCommit( ) method implemented by each registered component.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for maintaining distributed state consistency in a distributed computing application, the method comprising:
   registering a set of components of the distributed computing application with a consistency engine, the consistency engine including a mapping of valid contemporary states for each component of the set of components, each component of the set of components storing a contemporary state and a previously stored state;
   starting a transaction resulting in changes of state in different ones of the components in the registered set of components;
   determining in response to a conclusion of the transaction whether or not an inconsistency of state has arisen amongst the different components in the registered set of components in consequence of the changes of state in the different ones of the components in the registered set of components;
   directing each of the components in the registered set of components to rollback to the previously stored state if an inconsistency has arisen, but otherwise directing a committal of state in each of the components in the registered set of components; and,
   synchronizing each state for each of the components in the registered set of components with a centralized consistency state maintained by the consistency engine.

2. The method of claim 1, wherein determining in response to the conclusion of the transaction whether or not the inconsistency of state has arisen amongst the different components in the registered set in consequence of the changes of state in the different ones of the components in the registered set of components, comprises:
   determining in response to a conclusion of the transaction whether or not a failure to update state has occurred in at least one of the different components in the registered set of components.

3. The method of claim 1, wherein a checksum of the centralized consistency state is stored in connection with the centralized consistency state.

4. The method of claim 3, further comprising:
   validating the centralized consistency state at startup with the checksum; and,
   selecting a prior version of the centralized consistency state if the checksum does not validate the centralized consistency state at startup, but otherwise initializing each of the different components in the registered set of components with a last known state reflected in the validated centralized consistency state.

5. The method of claim 1, wherein synchronizing each state for each of the components in the registered set with the centralized consistency state maintained by the consistency engine comprises retrieving an updated state identifier for a current state of one of the components in the registered set and synchronizing the current state of one of the components in the registered set with a centralized consistency state identifier in the consistency engine.

6. The system of claim 1, wherein program code of the consistency engine that when executed by the processor causes the consistency engine to perform synchronizing each state for each of the components in the registered set with the centralized consistency state maintained by the consistency engine comprises retrieving an updated state identifier for a current state of one of the components in the registered set and synchronizing the current state of one of the components in the registered set with a centralized consistency state identifier in the consistency engine.

7. The computer program product of claim 1, wherein the computer usable program code for synchronizing each state for each of the components in the registered set with the centralized consistency state maintained by the consistency engine comprises computer usable program code for retrieving an updated state identifier for a current state of one of the components in the registered set and computer usable program code for synchronizing the current state of one of the components in the registered set with a centralized consistency state identifier in the consistency engine.

8. A distributed computing data processing system configured for maintaining distributed state consistency in a distributed computing application, the system comprising:
 a host computer comprising a processor and memory and configured for communicative coupling over a computer communications network to a plurality of remote hosts, each with processor and memory, each supporting a component of the distributed computing application; and,
 a consistency engine executing in the memory by the processor of the host computer, the consistency engine comprising program code that when executed by the processor causes the consistency engine to perform:
  registering a set of components of the distributed computing application with the consistency engine, the consistency engine including a mapping of valid contemporary states for each component of the set of components, each component of the set of components storing a contemporary state and previously stored state;
  starting a transaction resulting in changes of state in different ones of the components in the registered set of components;
  determining in response to a conclusion of the transaction whether or not an inconsistency of state has arisen amongst the different components in the registered set of components in consequence of the changes of state in the different ones of the components in the registered set of components;
  directing each of the components in the registered set of components to rollback to the previously stored state if an inconsistency has arisen, but otherwise directing a committal of state in each of the components in the registered set of components; and,
  synchronizing each state for each of the components in the registered set of components with a centralized consistency state maintained by the consistency engine.

9. The system of claim 8, further comprising a data store of consistency states coupled to the host computer, the data store of consistency states comprising a plurality of files, each file representing a single consistency state for each of the components in the registered set of components.

10. The system of claim 9, wherein each file further comprises a checksum of a represented consistency state.

11. A computer program product comprising a tangible memory embodying computer usable program code for maintaining distributed state consistency in a distributed computing application, the computer program product comprising:
 computer usable program code for registering a set of components of the distributed computing application with a consistency engine, the consistency engine including a mapping of valid contemporary states for each component of the set of components, each component of the set of components storing a contemporary state and a previously stored state;
 computer usable program code for starting a transaction resulting in changes of state in different ones of the components in the registered set of components;
 computer usable program code for determining in response to a conclusion of the transaction whether or not an inconsistency of state has arisen amongst the different components in the registered set of components in consequence of the changes of state in the different ones of the components in the registered set of components;
 computer usable program code for directing each of the components in the registered set of components to rollback to the previously stored state if an inconsistency has arisen, but otherwise directing a committal of state in each of the components in the registered set of components; and,
 computer usable program code for synchronizing each state for each of the components in the registered set of components with a centralized consistency state maintained by the consistency engine.

12. The computer program product of claim 11, wherein the computer usable program code for determining in response to the conclusion of the transaction whether or not the inconsistency of state has arisen amongst the different components in the registered set of components in consequence of the changes of state in the different ones of the components in the registered set of components, comprises:
 computer usable program code for determining in response to a conclusion of the transaction whether or not a failure to update state has occurred in at least one of the different components in the registered set of components.

13. The computer program product of claim 11, wherein a checksum of the centralized consistency state is stored in connection with the centralized consistency state.

14. The computer program product of claim 13, further comprising:
 computer usable program code for validating the centralized consistency state at startup with the checksum; and,
 computer usable program code for selecting a prior version of the centralized consistency state if the checksum does not validate the centralized consistency state at startup, but otherwise initializing each of the different components in the registered set of components with a last known state reflected in the validated centralized consistency state.

\* \* \* \* \*